H. J. HERT.
STEERING APPARATUS FOR AUTOMOBILES.
APPLICATION FILED JAN. 6, 1910.
980,636.
Patented Jan. 3, 1911.
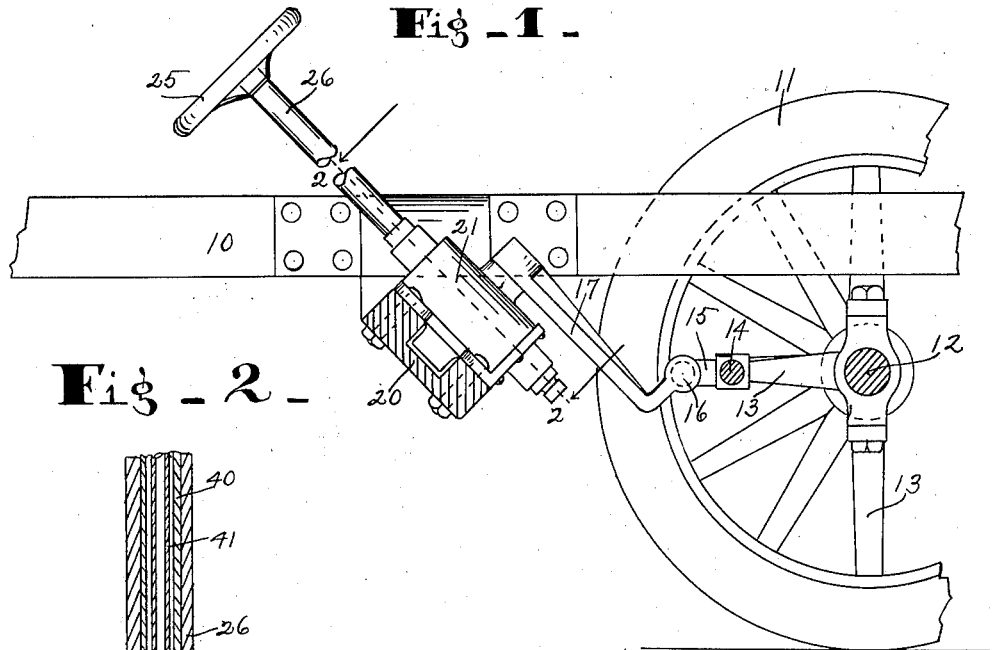
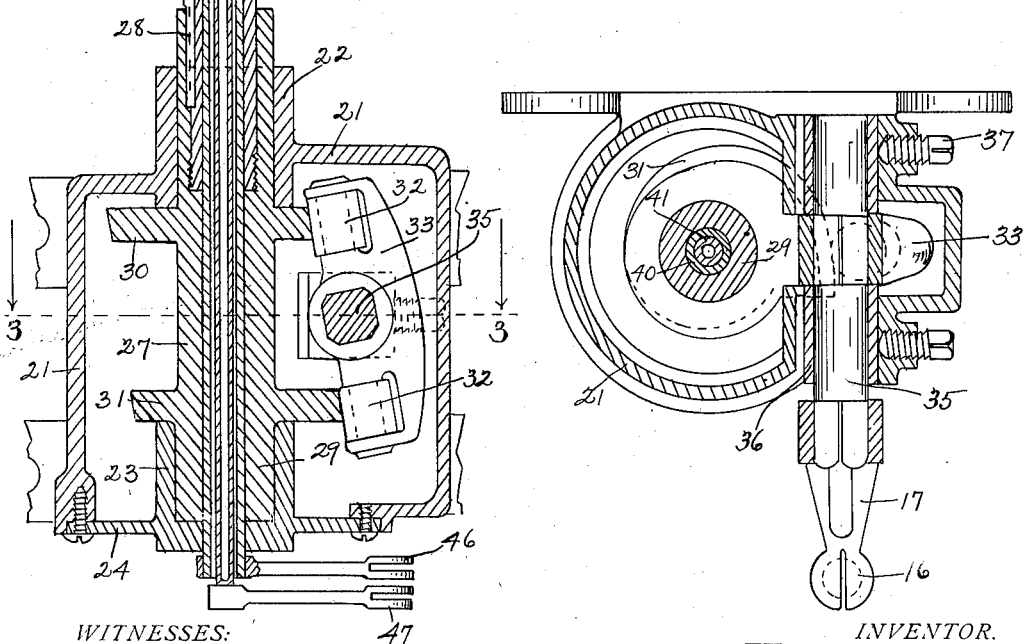
WITNESSES:
W. M. Gentle
O. M. McLaughlin
INVENTOR.
Henry J. Hert.
BY
V. H. Lockwood
ATTORNEY.

UNITED STATES PATENT OFFICE.

HENRY J. HERT, OF INDIANAPOLIS, INDIANA.

STEERING APPARATUS FOR AUTOMOBILES.

980,636.     Specification of Letters Patent.     Patented Jan. 3, 1911.

Application filed January 6, 1910. Serial No. 536,618.

*To all whom it may concern:*

Be it known that I, HENRY J. HERT, of Indianapolis, county of Marion, and State of Indiana, have invented a certain new and useful Steering Apparatus for Automobiles; and I do hereby declare that the following is a full, clear, and exact description thereof, reference being had to the accompanying drawings.

The object of this invention is to improve the construction of steering apparatus for automobiles and the like.

The chief feature of the invention consists in providing on the steering tube a pair of radially extending cams or cam disks disposed at right angles to the steering tube and oppositely extending or staggered in relation to each other, and a rocking lever vertically disposed and secured between its ends on a horizontal shaft with the ends of the lever in position to be actuated alternately by the cams so that the lever will be rocked, and means operated by the shaft for steering the wheels of the vehicle.

Quite an important feature of the invention consists in forming the pair of cams integral with the steering tube or part connected therewith, that is, the cams and the part on which they are secured are all integral and the peripheries of the cams are similarly beveled or formed so that both will at all times bear with the full width of their surfaces against the ends of the lever actuated by them, or the anti-friction rollers on such lever.

The nature of the invention will be understood from the accompanying drawings and the following description and claims.

In the drawings Figure 1 is a central section through the forward portion of the chassis of an automobile. Fig. 2 is a central longitudinal section through the steering tube on the line 2—2 of Fig. 1. Fig. 3 is a transverse section on the line 3—3 of Fig. 2, with the cam in an altered position.

In the drawings there is shown the part of the frame 10 of an automobile and a forward wheel 11 on a spindle 12 having an arm 13 extending therefrom to a cross bar 14 from which an arm 15 extends that is connected by a ball and socket joint 16 with the lower end of the arm or crank 17.

On the cross bar 20 forming a part of the frame a casing 21 is secured. This casing has an upper bearing portion 22 and a lower bearing portion 23 on a cap 24 which closes the lower end of the casing and is removable.

The steering wheel 25 is secured on the tube 26 which is screwed into a lower extension or continuation 27 of said tube. The parts 26 and 27 are splined at 28, so that while they are made separate, when united the parts 26 and 27 constitute practically one element, the steering tube. The lower end of the portion 27 of the steering tube fits in the bearing 23 and also abuts against the cap 24 of the casing which resists the downward thrust. The upper part of the portion 27 fits in bearing 22 in the casing and a pair of cams 30 and 31 are integral with the portion 27 of the steering tube and bear respectively against the bearing portions 22 and 23, so that the parts are snugly mounted.

The cams 30 and 31 extend transversely of the steering tube and their peripheries are eccentric to the steering tube and they are arranged in staggered position and in substantially opposite relative positions. They are spaced apart a few inches, one above the other, in position to engage the anti-friction rollers 32 on a vertically disposed lever 33 secured between its ends and between the rollers 32 on a horizontal shaft 35. The arrangement is such that as the steering tube is oscillated the cams will rock the lever 33.

The shaft 35, see Fig. 3, is mounted in a pair of movable boxes 36 in the casing and set screws 37 move said bearing boxes so as to snugly hold the ends of the lever 33 against the cam disks 30 and 31. One end of the shaft 35 extends outside the casing and has secured upon it the upper end of the steering arm 17.

The steering shaft is tubular, which permits the tubes or rods 40 and 41 to extend down through the same and one within the other to a point below the casing 21 of the cap 24 and at their lower ends carry respectively the rods 46 and 47 which lead to the ignition and throttle mechanisms for controlling the same.

The cams 30 and 31 have their faces so beveled transversely relative to each other that during all the movements thereof the ends of the lever 33, or rather the rollers 32, will bear constantly against both cams and for the full width of the periphery of each. Hence the portions of the surfaces of said cams in the same planes must be similarly beveled so that at any portion of the periphery of the cams if a straight edge were laid on the two cams transversely thereof, it would touch the surface of both cams for the full width thereof, as indicated in Fig. 2. Hence this requires that the periphery of each cam be formed as indicated in Fig. 3. These cam surfaces are formed simultaneously by a single instrument so that at all points transversely they will be true with each other and at all times be able to bear against the ends of the lever 33.

What I claim as my invention and desire to secure by Letters Patent is:

1. Steering apparatus for automobiles including a steering tube, a pair of cam disks secured on said tube and projecting transversely therefrom, a steering shaft mounted at a right angle to said steering tube and on a line midway between said cams, and a rocking lever secured on said shaft with the ends in engagement with said cams.

2. Steering apparatus for automobiles including a steering tube, a pair of cam disks secured on said tube and projecting transversely therefrom, a steering shaft mounted at a right angle to said steering tube and on a line midway between said cams, a rocking lever secured between its ends on said shaft, and anti-friction rollers on said lever in engagement with said cams.

3. Steering apparatus for automobiles including a steering tube, a pair of cam disks secured on said tube and projecting transversely therefrom, a steering shaft mounted at a right angle to said steering tube and on a line midway between said cams, a rocking lever secured on said shaft with the ends in engagement with said cams, and means for adjustably forcing said shaft toward the steering tube for holding the ends of said lever against said cams.

4. Steering apparatus for automobiles including a steering tube, a steering shaft mounted at a right angle to said tube, a rocking lever secured on said shaft substantially parallel with said tube and with bearing portions on opposite sides of the shaft that are in alinement with each other, and a pair of cam disks secured on said tube and projecting transversely therefrom one on each side of said shaft in position for their peripheries to engage the bearing portions of said lever, said cams extending oppositely with relation to each other and with their peripheries spirally disposed and formed in every plane diametrically through the pair of cams so as to be in alinement with each other for their full width and thus in all positions bear for their full width against both bearing surfaces on said lever.

In witness whereof, I have hereunto affixed my signature in the presence of the witnesses herein named.

HENRY J. HERT.

Witnesses:
G. H. BOINK,
O. M. McLAUGHLIN.